US012561700B2

(12) United States Patent
Zhu et al.

(10) Patent No.: US 12,561,700 B2
(45) Date of Patent: Feb. 24, 2026

(54) METHOD, APPARATUS, DEVICE AND STORAGE MEDIUM FOR PROCESSING INFORMATION

(71) Applicant: Beijing Youzhuju Network Technology Co., Ltd., Beijing (CN)

(72) Inventors: Qi Zhu, Beijing (CN); Zhenyu Li, Beijing (CN); Yiding Cheng, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/972,857

(22) Filed: Dec. 7, 2024

(65) Prior Publication Data

US 2026/0044865 A1    Feb. 12, 2026

(30) Foreign Application Priority Data

Aug. 8, 2024    (CN) .......................... 202411087967.8

(51) Int. Cl.
*G06F 16/00*        (2019.01)
*G06Q 30/018*        (2023.01)

(52) U.S. Cl.
CPC .................................. *G06Q 30/018* (2013.01)

(58) Field of Classification Search
CPC .................................................... G06Q 30/018
USPC .......................................................... 707/610
See application file for complete search history.

(56) References Cited

U.S. PATENT DOCUMENTS

2022/0337508 A1* 10/2022 Wang ..................... H04L 45/28
                                                                707/707

* cited by examiner

*Primary Examiner* — Alexandria Y Bromell
(74) *Attorney, Agent, or Firm* — BakerHostetler

(57) ABSTRACT

The embodiment of the disclosure relates to a method, apparatus, electronic device and a storage medium for processing information. The method includes: providing a target interface, the target interface displaying an upload portal corresponding to a to-be-verified file corresponding to a target business in a target region; in response to obtaining a plurality of to-be-verified files through the upload portal, determining attribute states of a plurality of business attributes corresponding to the target region based on configured business attribute information, the configured business attribute information indicating current attribute states of different types of business attribute requirements; determining, based on the attribute states of the plurality of business attributes, verification states of a plurality of business attribute groups associated with the target region, wherein a verification state of each business attribute group is determined based on an attribute state of at least one business attribute in the business attribute group.

18 Claims, 9 Drawing Sheets

300

| OBJECT CATEGORY | REGION | BUSINESS ATTRIBUTE | BUSINESS ATTRIBUTE STATE | EXPECTED EFFECTIVE TIME | ACTUAL EFFECTIVE TIME | OPERATION |
|---|---|---|---|---|---|---|
| 111111 | REGION 1 | REQUIRING TO UPLOAD 310 THE VERIFICATION FILE RELATED TO THE BUSINESS ATTRIBUTE 1 | VALID | 2023.12.18 20:20:00 | 2023.12.18 20:20:24 | 330 OPERATION LOG |
| 111111 | REGION 2 | REQUIRING TO UPLOAD 320 THE VERIFICATION FILE RELATED TO THE BUSINESS ATTRIBUTE 2 | EXPIRED AND INVALID | 2023.12.18 20:02:00 | 2023.12.18 20:05:16 | 340 OPERATION LOG |
| 111111 | REGION 1 | REQUIRING TO UPLOAD THE VERIFICATION FILE RELATED TO THE BUSINESS ATTRIBUTE 3 | EXPIRED AND INVALID | 2023.12.18 20:02:00 | 2023.12.18 20:05:16 | OPERATION LOG |
| 222222 | REGION 1 | REQUIRING TO UPLOAD THE VERIFICATION FILE RELATED TO THE BUSINESS ATTRIBUTE 4 | VALID | 2023.12.18 20:39:00 | 2023.12.18 20:41:44 | OPERATION LOG |

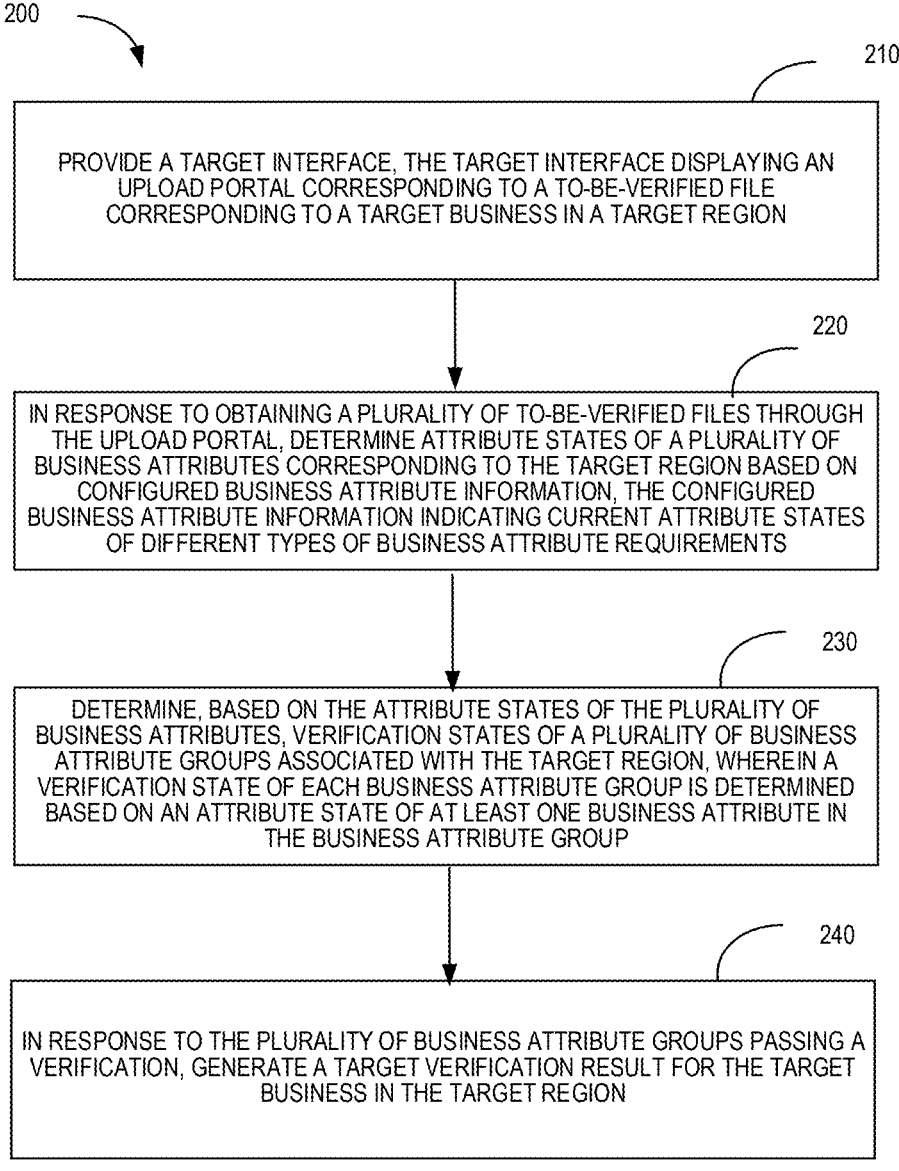

200

210

PROVIDE A TARGET INTERFACE, THE TARGET INTERFACE DISPLAYING AN UPLOAD PORTAL CORRESPONDING TO A TO-BE-VERIFIED FILE CORRESPONDING TO A TARGET BUSINESS IN A TARGET REGION

220

IN RESPONSE TO OBTAINING A PLURALITY OF TO-BE-VERIFIED FILES THROUGH THE UPLOAD PORTAL, DETERMINE ATTRIBUTE STATES OF A PLURALITY OF BUSINESS ATTRIBUTES CORRESPONDING TO THE TARGET REGION BASED ON CONFIGURED BUSINESS ATTRIBUTE INFORMATION, THE CONFIGURED BUSINESS ATTRIBUTE INFORMATION INDICATING CURRENT ATTRIBUTE STATES OF DIFFERENT TYPES OF BUSINESS ATTRIBUTE REQUIREMENTS

230

DETERMINE, BASED ON THE ATTRIBUTE STATES OF THE PLURALITY OF BUSINESS ATTRIBUTES, VERIFICATION STATES OF A PLURALITY OF BUSINESS ATTRIBUTE GROUPS ASSOCIATED WITH THE TARGET REGION, WHEREIN A VERIFICATION STATE OF EACH BUSINESS ATTRIBUTE GROUP IS DETERMINED BASED ON AN ATTRIBUTE STATE OF AT LEAST ONE BUSINESS ATTRIBUTE IN THE BUSINESS ATTRIBUTE GROUP

240

IN RESPONSE TO THE PLURALITY OF BUSINESS ATTRIBUTE GROUPS PASSING A VERIFICATION, GENERATE A TARGET VERIFICATION RESULT FOR THE TARGET BUSINESS IN THE TARGET REGION

| OBJECT CATEGORY | REGION | BUSINESS ATTRIBUTE | BUSINESS ATTRIBUTE STATE | EXPECTED EFFECTIVE TIME | ACTUAL EFFECTIVE TIME | OPERATION |
|---|---|---|---|---|---|---|
| 111111 | REGION 1 | REQUIRING TO UPLOAD 310 THE VERIFICATION FILE RELATED TO THE BUSINESS ATTRIBUTE 1 | VALID | 2023.12.18 20:20:00 | 2023.12.18 20:20:24 | 330 OPERATION LOG |
| 111111 | REGION 2 | REQUIRING TO UPLOAD 320 THE VERIFICATION FILE RELATED TO THE BUSINESS ATTRIBUTE 2 | EXPIRED AND INVALID | 2023.12.18 20:02:00 | 2023.12.18 20:05:16 | 340 OPERATION LOG |
| 111111 | REGION 1 | REQUIRING TO UPLOAD THE VERIFICATION FILE RELATED TO THE BUSINESS ATTRIBUTE 3 | EXPIRED AND INVALID | 2023.12.18 20:02:00 | 2023.12.18 20:05:16 | OPERATION LOG |
| 222222 | REGION 1 | REQUIRING TO UPLOAD THE VERIFICATION FILE RELATED TO THE BUSINESS ATTRIBUTE 4 | VALID | 2023.12.18 20:39:00 | 2023.12.18 20:41:44 | OPERATION LOG |

FIG. 3

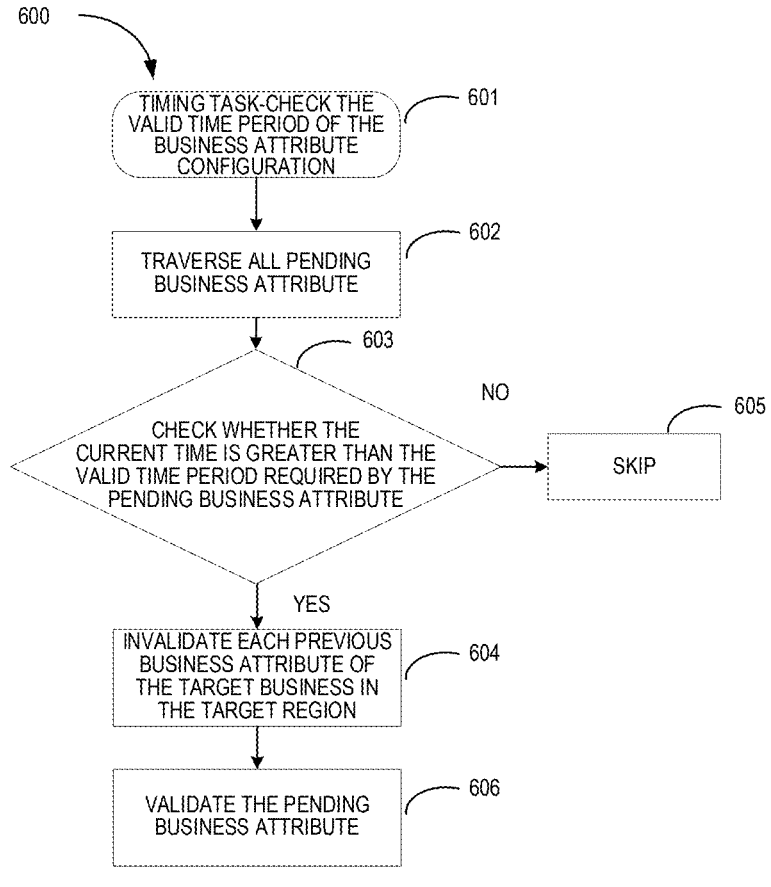

600

601
TIMING TASK-CHECK THE
VALID TIME PERIOD OF THE
BUSINESS ATTRIBUTE
CONFIGURATION

602
TRAVERSE ALL PENDING
BUSINESS ATTRIBUTE

603
CHECK WHETHER THE
CURRENT TIME IS GREATER THAN THE
VALID TIME PERIOD REQUIRED BY THE
PENDING BUSINESS ATTRIBUTE

NO

605
SKIP

YES

604
INVALIDATE EACH PREVIOUS
BUSINESS ATTRIBUTE OF
THE TARGET BUSINESS IN
THE TARGET REGION

606
VALIDATE THE PENDING
BUSINESS ATTRIBUTE

INVALID

OPERATOR:

2023.11.17 10:27:21

INVALID

OPERATOR:

2023.11.17 00:06:25

TO-BE-VERIFIED FILE RELATED TO
THE BUSINESS ATTRIBUTE 1

OPERATOR: USER A 2023.11.16 20:31:07

TO-BE-VERIFIED FILE RELATED TO
THE BUSINESS ATTRIBUTE 1

OPERATOR: USER A 2023.11.16 20:30:45

METHOD, APPARATUS, DEVICE AND STORAGE MEDIUM FOR PROCESSING INFORMATION

This application claims the priority to Chinese Patent Application No. 202411087967.8, filed on Aug. 8, 2024, entitled "Method, Apparatus, Device and Storage Medium for Processing Information", the entire content of which is incorporated herein by reference.

FIELD

Example embodiments of the present disclosure generally relate to the field of computers, and in particular, to a method, apparatus, electronic device, and storage medium for processing information.

BACKGROUND

With the rapid development of informatization, some target business needs to be verified in a certain region, and only a predetermined operation can be performed when the verification is passed. For example, for a commodity category, if the commodity category is intended to be released locally, the qualification authentication requirement of the target region to be shelved needs to be satisfied. How to efficiently obtain a verification result of a target business in a certain region is a focus problem of concern.

SUMMARY

In a first aspect of the present disclosure, a method for processing information is provided. The method comprises: providing a target interface, the target interface displaying an upload portal corresponding to a to-be-verified file corresponding to a target business in a target region; in response to obtaining a plurality of to-be-verified files through the upload portal, determining attribute states of a plurality of business attributes corresponding to the target region based on configured business attribute information, the configured business attribute information indicating current attribute states of different types of business attribute requirements; determining, based on the attribute states of the plurality of business attributes, verification states of a plurality of business attribute groups associated with the target region, wherein a verification state of each business attribute group is determined based on an attribute state of at least one business attribute in the business attribute group; and in response to the plurality of business attribute groups passing a verification, generating a target verification result for the target business in the target region.

In a second aspect of the present disclosure, an apparatus for processing information is provided. The apparatus comprises: a providing module, a providing module, configured to provide a target interface, the target interface displaying an upload portal corresponding to a to-be-verified file corresponding to a target business in a target region; a first determining module, configured to, in response to obtaining a plurality of to-be-verified files through the upload portal, determine attribute states of a plurality of business attributes corresponding to the target region based on configured business attribute information, the configured business attribute information indicating current attribute states of different types of business attribute requirements; a second determining module, configured to determine, based on the attribute states of the plurality of business attributes, verification states of a plurality of business attribute groups associated with the target region, wherein a verification state of each business attribute group is determined based on an attribute state of at least one business attribute in the business attribute group; and a generation module, configured to, in response to the plurality of business attribute groups passing a verification, generate a target verification result for the target business in the target region.

In a third aspect of the present disclosure, an electronic device is provided. The device comprises at least one processing unit; and at least one memory coupled to the at least one processing unit and storing instructions for execution by the at least one processing unit. The instructions, when executed by the at least one processing unit, cause the device to perform the method of the first aspect.

In a fourth aspect of the present disclosure, a computer-readable storage medium is provided. The computer-readable storage medium stores a computer program, and the computer program is executable by the processor to implement the method of the first aspect.

It should be understood that the content described in this content section is not intended to limit the key features or important features of the embodiments of the present disclosure, nor is it intended to limit the scope of the present disclosure. Other features of the present disclosure will become readily understood from the following description.

BRIEF DESCRIPTION OF DRAWINGS

The above and other features, advantages, and aspects of various embodiments of the present disclosure will become more apparent from the following detailed description in connection with the accompanying drawings. In the drawings, the same or similar reference numbers refer to the same or similar elements, wherein:

FIG. 2 shows a flowchart of a process of processing information according to some embodiments of the present disclosure;

FIG. 3 illustrates an example interaction interface according to some embodiments of the present disclosure;

FIG. 6 is a schematic diagram of a process of whether a business attribute is valid according to some embodiments of the present disclosure;

DETAILED DESCRIPTION

Figure 1:
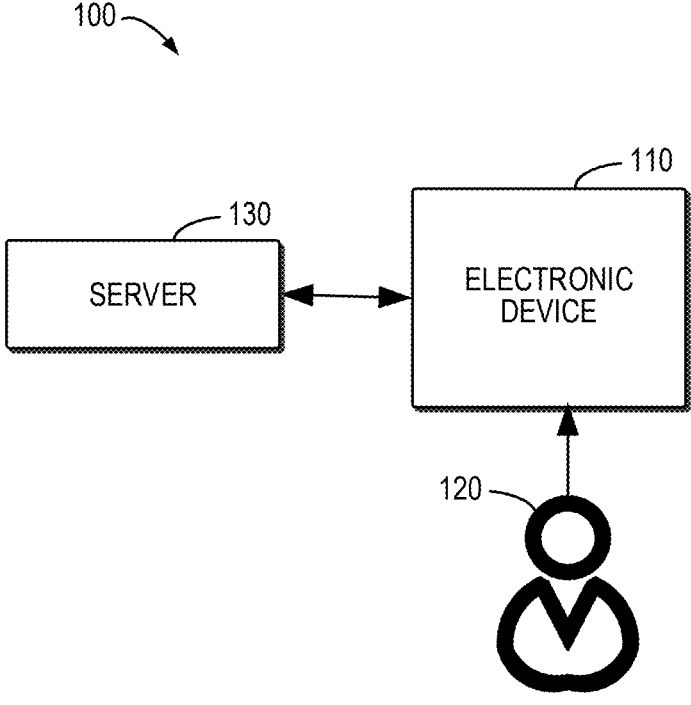
FIG. 1 illustrates a schematic diagram of an example environment in which embodiments of the present disclosure can be implemented.

Embodiments of the present disclosure will be described in more detail below with reference to the accompanying drawings. While certain embodiments of the present disclosure are shown in the accompanying drawings, it should be understood that the present disclosure may be implemented in various forms, and should not be construed as limited to the embodiments set forth herein, but rather, these embodiments are provided for a more thorough and complete understanding of the present disclosure. It should be understood that the drawings and embodiments of the present disclosure are for exemplary purposes only and are not intended to limit the scope of the present disclosure.

It should be noted that the title of any section/subsection provided herein is not limiting. Various embodiments are described throughout and any type of embodiments may be included in any section/subsection. Furthermore, the embodiments described in any section/subsection may be combined in any manner with the same section/subsection and/or any other embodiment described in different sections/subsections.

In the description of the embodiments of the present disclosure, the terms "including" and the like should be understood to include "including but not limited to". The term "based on" should be understood as "based at least in part on". The terms "one embodiment" or "the embodiment" should be understood as "at least one embodiment". The term "some embodiments" should be understood as "at least some embodiments". Other explicit and implicit definitions may also be included below. The terms "first," "second," and the like may refer to different or identical objects. Other explicit and implicit definitions may also be included below.

Embodiments of the present disclosure may relate to data of a user, acquisition and/or use of data, and the like. These aspects all follow the corresponding laws and regulations and related regulations. In the embodiments of the present disclosure, all data is collected, obtained, processed, processed, forwarded, used, etc., all of which are performed on the premise that the user knows and confirms. Accordingly, when implementing the embodiments of the present disclosure, the types, the usage scope, the usage scenario, and the like of the data or information that may be involved, should be notified to the user and obtain the authorization of the user in an appropriate manner according to the relevant laws and regulations. The specific notification and/or authorization manner may vary according to actual situations and application scenarios, and the scope of the present disclosure is not limited in this respect.

According to the solutions in the present specification and the embodiments, for example, personal information processing is involved, processing may be performed on the premise of having a legality basis (for example, obtaining consent of a personal information subject, or necessary for performing a fulfillment contract), and processing only within a specified or agreed range. The user rejects personal information other than necessary information required by the basic function, and does not affect the basic function of the user.

In a conventional manner, a business attribute configuration requirement is diversified, for example, when the region is different, a business attribute required to be verified is not necessarily the same, business attributes of different business that is required to be verified are not necessarily the same, a single business attribute may be required for some business attribute configurations, a plurality of business attributes may also be required, a business attribute may be selected from a plurality of business attributes, business attributes may be combined with each other, and how to efficiently perform business attribute verification is a focus problem of concern.

The embodiment of the present disclosure provides a scheme for processing information. According to various embodiments of the present disclosure, a target interface may be provided, where the target interface displays an upload portal corresponding to a to-be-verified file corresponding to a target business in a target region; in response to obtaining a plurality of to-be-verified files through the upload portal, attribute states of a plurality of business attributes corresponding to the target region may be determined based on configured business attribute information, the configured business attribute information indicating current attribute states of different types of business attribute requirements; based on the attribute states of the plurality of business attributes, verification states of a plurality of business attribute groups associated with the target region may be determined, wherein a verification state of each business attribute group is determined based on an attribute state of at least one business attribute in the business attribute group; and in response to the plurality of business attribute groups passing a verification, a target verification result for the target business in the target region may be generated.

According to the embodiment of the present disclosure, whether the plurality of business attribute groups associated with the target region pass the verification or not can be determined, thereby the target verification result of the target business in the target region can be determined, and the verification efficiency of the target business in the target region can be effectively improved.

Example Environment

FIG. 1 illustrates a schematic diagram of an example environment 100 in which embodiments of the present disclosure can be implemented. As shown in FIG. 1, the example environment 100 may comprise an electronic device 110.

In this example environment 100, the electronic device 110 may present a target interface. The target interface is used by the user 120 to upload the to-be-verified verification files corresponding to the target business in the target area, and may also assist the user 120 in viewing the verification state or the verification result corresponding to the plurality of business attributes.

In some embodiments, the electronic device 110 communicates with the server 130 to implement service related to business attribute verification. The electronic device 110 may be any type of mobile terminal, fixed terminal, or portable terminal, including a mobile phone, a desktop computer, a laptop computer, a notebook computer, a netbook computer, a tablet computer, a media computer, a multimedia tablet, a palmtop computer, a portable terminal, a VR/AR device, a personal communication system (PCS) device, a personal navigation device, a personal digital assistant (PDA), an audio/video player, a digital camera/camcorder, a positioning device, a television receiver, a radio broadcast receiver, an electronic book device, a gaming device, or any combination of the foregoing, including accessories and peripherals of these devices, or any combination thereof. In some embodiments, the electronic device 110 can also support any type of interface for a user (such as a "wearable" circuit, etc.).

The server 130 may be a standalone physical server, a server cluster composed of a plurality of physical servers, or a distributed system, or may be a cloud server that provides basic cloud computing services such as cloud services, cloud databases, cloud computing, cloud functions, cloud storage, network services, cloud communications, middleware services, domain name services, security services, content distribution networks, and big data and artificial intelligence platforms. The server 130 may include, for example, a computing system/server, such as a mainframe, an edge computing node, a computing device in a cloud environment, or the like.

A communication connection may be established between the server 130 and the electronic device 110. The communication connection may be established in a wired manner or a wireless manner. The communication connection may include, but is not limited to, a Bluetooth connection, a mobile network connection, a Universal Serial Bus (USB) connection, a Wireless Fidelity (WiFi) connection, and the like, and the embodiments of the present disclosure are not limited in this aspect. In an embodiment of the present disclosure, the server 130 and the electronic device 110 may implement signaling interaction through a communication connection between the server 130 and the electronic device 110.

It should be understood that the structures and functions of the various elements in the environment 100 are described for exemplary purposes only and do not imply any limitation to the scope of the present disclosure.

Example Processes

FIG. 2 shows a flowchart of a process 200 for processing information according to some embodiments of the present disclosure. Process 200 may be implemented at electronic device 110. The process 200 is described below with reference to FIG. 1.

In block 210, the electronic device 110 provides a target interface, the target interface displaying an upload portal corresponding to a to-be-verified file corresponding to a target business in a target region.

In some embodiments, the target business may be any suitable business, for example, a shelf business of a target object category, or certainly may be any other suitable business. The target object category may be any suitable category, for example, may be a clothing category, a household appliance category, a food category, or the like. The region may also be any suitable region, and may be a country, a province, or the like. In some embodiments, for different regions, business attributes that need to be met by the same business requirement may be different, or may be the same. For different businesses, business attributes that need to be met by the same region may be different, or may be the same.

In some embodiments, the electronic device 110 may provide a target interface. The target interface may display an upload portal corresponding to the to-be-verified file corresponding to the target business in the target area, so as to support the user to upload the corresponding to-be-verified file based on each upload portal. In some embodiments, the to-be-verified file may be any appropriate file, for example, if the target business is a shelf business of the target object in the target region, the to-be-verified file may be a qualification file. The qualification file is used to determine attribute states of a plurality of business attributes corresponding to the target region, and the business attribute may be any suitable attribute.

Taking FIG. 3 as an example, when the object category "11111" and the region "region 1" may be displayed in the interface 300, the to-be-verified file 1 and the to-be-verified file 3 need to be uploaded, and for the to-be-verified file 1, the electronic device 110 may display the upload portal 310 in the interface 300. For the to-be-verified file 3, the electronic device 110 may display the upload portal 320 in the interface 300.

In some embodiments, the target interface may further display business attribute configuration information, where the business attribute configuration information includes a plurality of business attributes and target information of a plurality of business attributes, and the target information may include, but is not limited to, an object category, a region, a verification requirement, a verification state, an operation, and the like.

In some embodiments, the plurality of business attributes may be obtained based on the target file. The target file may be any suitable type of business attribute configuration file, for example, an excel file. The target file may include target information of the target business in the target area. In some embodiments, the target file may further include each to-be-verified business attribute and a type of each business attribute group included in the plurality of business attribute groups. In some embodiments, the business attribute group may include a first business attribute group and a second business attribute group, and the first business attribute group and the second business attribute group correspond to different types. In some embodiments, taking the target business as the shelf business of the target object category as an example, the target file may be shown in Table 1 below, where each row in Table 1 corresponds to the information of one business attribute.

TABLE 1

| Last Level Category ID | Last category English | Target Region | Business Attribute | Whether the Verification requirement is a multiple choice | Whether the to-be-verified file corresponding to the business attribute must be uploaded | Whether to delete all business attributes | Please fill in the same number for the business attributes (e.g., selectone from the three) of the same group |
|---|---|---|---|---|---|---|---|
| 111111 | Party Dresses | A | Business Attribute 1 | No | No | 1 | 1 |

TABLE 1-continued

| Last Level Category ID | Last category English | Target Region | Business Attribute | Whether the Verification requirement is a multiple choice | Whether the to-be-verified file corresponding to the business attribute must be uploaded | Whether to delete all business attributes | Please fill in the same number for the business attributes (e.g., select one from the three) of the same group |
|---|---|---|---|---|---|---|---|
| 111111 | Party Dresses | A | Business Attribute 2 | No | Yes | | 1 |
| 111111 | Party Dresses | A | Business Attribute 3 | Yes | Yes | | 2 |
| 111111 | Party Dresses | A | Business Attribute 4 | Yes | Yes | | 2 |
| 111111 | Party Dresses | A | Business Attribute 5 | Yes | Yes | | 3 |
| 111111 | Party Dresses | A | Business Attribute 6 | Yes | Yes | | 3 |
| 111111 | Party Dresses | A | Business Attribute 7 | Yes | Yes | | 3 |

Taking FIG. 3 as an example, after obtaining the uploaded target file, the electronic device 110 may parse the target file.

Using Table 1 as an example, the electronic device 110 may determine, based on a number corresponding to each business attribute in the target file (the last column in Table 1), each to-be-verified business attribute included in each business attribute group, for example, the electronic device 110 may determine all business attributes corresponding to the number 1 as a business attribute group, determine all business attributes corresponding to the number 2 as a business attribute group, and determine all business attributes corresponding to the number 3 as a business attribute group. In some embodiments, the electronic device 110 may set, for each business attribute group, a business attribute group identification corresponding to each business attribute group.

Using Table 1 as an example, the electronic device 110 may determine, for each business attribute group, whether the business attribute group is a second business attribute group, wherein, if one business attribute in the plurality of business attribute in the second business attribute group passed the verification, then the second attribute group passed the verification, based on whether a verification requirement corresponding to each business attribute in the business attribute group is multiple choice, that is, determine whether only one business attribute in the plurality of business attributes in the business attribute group passes the verification, then the business attribute group passed the verification. The electronic device 110 may determine, for each business attribute group, whether the business attribute group is the first business attribute group, specifically, each business attribute in the plurality of the business attribute in the first business attribute group passes the verification, then the first business attribute group passes the verification, based on whether the verification requirement corresponding to each business attribute in the business attribute group is multiple choice, that is, determine whether each business attribute in the plurality of business attributes in the business attribute group passes the verification, then the business attribute group passes the verification.

In some embodiments, the electronic device 110 may determine, based on whether a verification requirement corresponding to each business attribute included in the business attribute group is a multiple choice, a field value corresponding to the target field corresponding to this business attribute group, to represent whether this business attribute group is the first business attribute group or the second business attribute group. Taking FIG. 3 as an example, the electronic device 110 may set the target field as required_all. When the field value corresponding to required_all is true, it is determined that this business attribute group is the first business attribute group, that is, when all business attributes in this business attribute group all passes the verification, then this business attribute group passes the verification, and when the field value corresponding to required_all is false, it is determined that this business attribute group is the second business attribute group, that is, when any one business attribute in this business attribute group passes the verification, then this business attribute group passes the verification.

In some embodiments, the electronic device 110 may determine whether the target file comprises a second identification corresponding to each business attribute, wherein the second identification represents a business attribute reset. Using Table 1 as an example, if a field value corresponding to the field "whether to delete all business attributes" under a certain business attribute is "yes", then the electronic device 110 may determine that the business attribute is set with a reset identification.

After determining whether the target file comprises the second identification corresponding to the plurality of business attributes, if in response to at least one business attribute in the plurality of business attributes is set with a second identification, the electronic device 110 deletes the target file, that is, determines not to obtain the plurality of business attributes based on the target file. The electronic device 110 may obtain a plurality of business attributes based on the new file in response to receiving the new file, so as to perform business attribute verification based on the new plurality of business attributes.

In some embodiments, after determining whether the target file includes the second identification corresponding to the plurality of business attributes, if in response to the plurality of business attributes all do not include the second identification, the electronic device 110 obtains the plurality of business attributes based on the target file.

In some embodiments, the electronic device 110 may judge, in response to that none of the plurality of business attributes is set with the second identification, whether a pending business attribute configuration is previously uploaded, where the pending business attribute configuration is a business attribute configuration of the previous target business in the target region, and the business attribute configuration includes a plurality of previously configured business attributes. The electronic device 110 may perform the business attribute configuration based on the target file, that is, obtain the plurality of business attributes based on the target file, in response to the absence of the previously uploaded pending business attribute configuration. The electronic device 110 may determine the target file as a latest pending business attribute configuration in response to the presence of the previously uploaded pending business attribute configuration, that is, determine the latest pending business attribute based on the plurality of business attributes in the target file.

Figure 4:
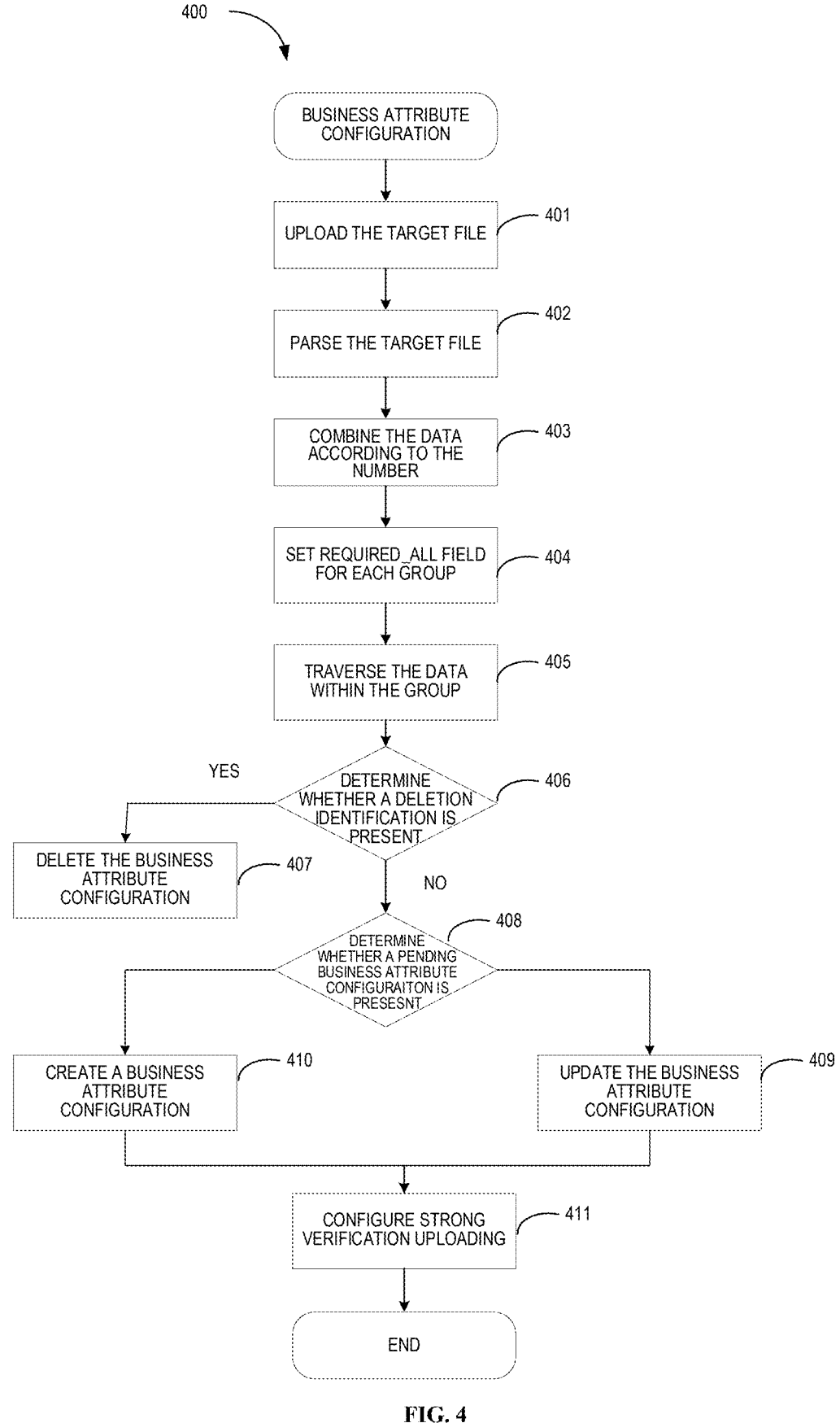
FIG. 4 is a schematic diagram of a process of a business attribute configuration according to some embodiments of the present disclosure.

FIG. 4 is a schematic diagram of a process of the business attribute configuration according to some embodiments of the present disclosure.

At block 401, the user uploads the target file, such that the electronic device 110 may receive the uploaded target file.

At block 402, the electronic device 110 parses the target file and parses the business attribute configuration information comprised in the target file.

At block 403, the electronic device 110 may determine, based on a number corresponding to each business attribute in the target file, a plurality of business attributes comprised in each business attribute group.

At block 404, the electronic device 110 may set a corresponding required_all field for each business attribute group.

At block 405, the electronic device 110 may traverse the intra-group data, that is, traverse data corresponding to each business attribute in the target file.

At block 406, the electronic device 110 may judge whether each business attribute corresponds to a deletion identification, if yes, perform the operation at block 407, otherwise, perform the operation at block 408.

At block 407, the electronic device 110 deletes the plurality of business attributes, that is, does not perform the business attribute configuration based on the target file.

At block 408, the electronic device 110 may judge whether there is a pending business attribute configuration previously, if yes, perform the operation at block 409, otherwise, perform the operation of at block 410.

At block 409, the electronic device 110 may update the business attribute configuration, that is, delete the previous pending business attribute configuration, and perform the business attribute configuration based on the target file.

At block 410, the electronic device 110 may create a business attribute configuration, that is, perform a business attribute configuration based on the target file.

At block 411, the electronic device 110 may configure the strong verification uploading, that is, setting the first identification to set whether the business attribute is a business attribute that must be satisfied.

Specifically, for the business attribute that must be satisfied, the first identification corresponding to it may be set to be true, otherwise false.

Figure 5:
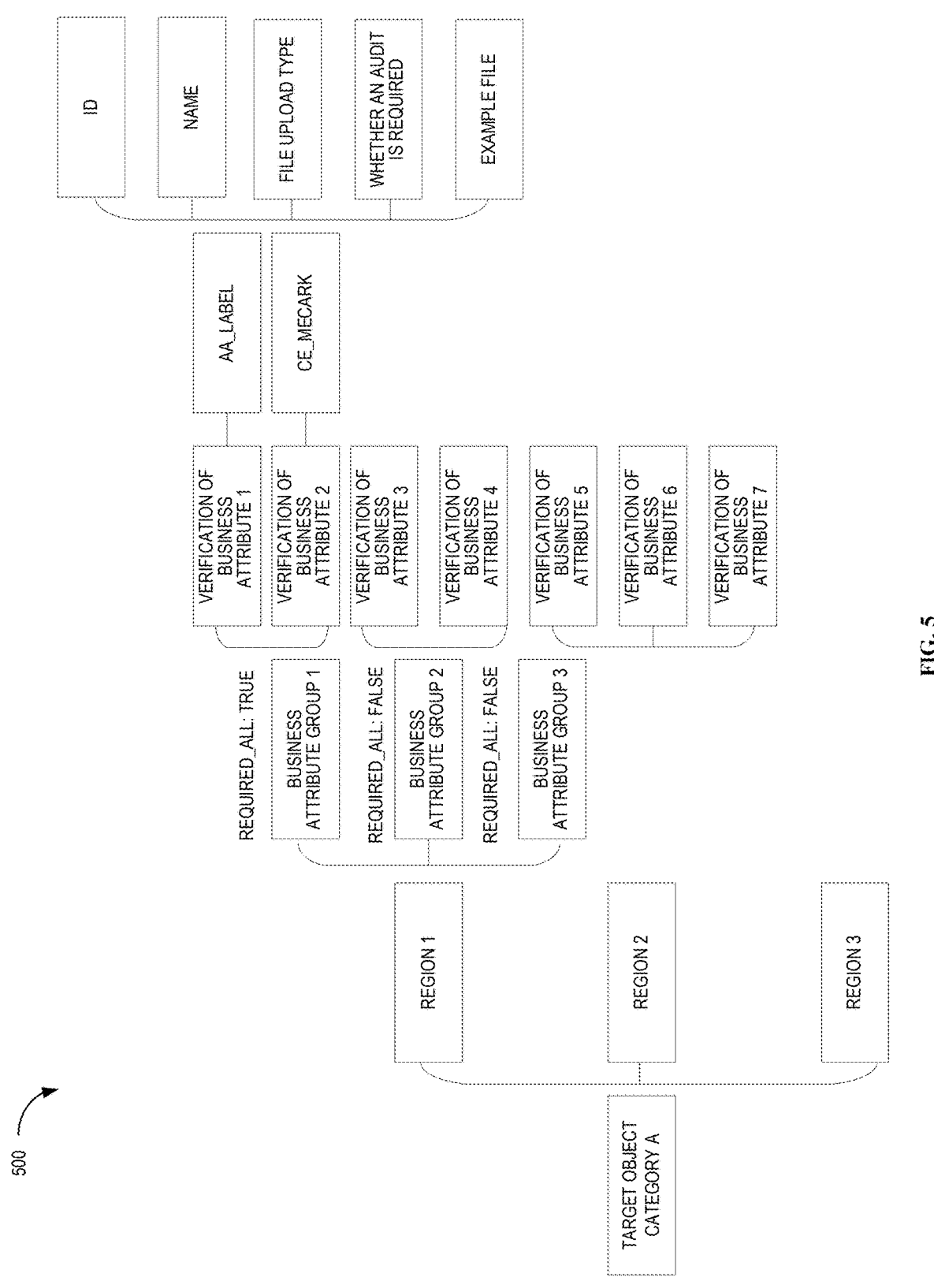
FIG. 5 is a schematic diagram of a result of a business attribute configuration according to some embodiments of the present disclosure.

FIG. 5 is a schematic diagram of a result of a business attribute configuration according to some embodiments of the present disclosure, and the FIG. 5 is taken as an example for description.

For the target object category A, under the region 1, corresponding 3 business attribute groups are respectively a business attribute group 1, a business attribute group 2, and a business attribute group 3. For the business attribute group 1, a field value corresponding to the required_all of the business attribute group 1 is set to true. For the business attribute group 2, a field value corresponding to the required_all of the business attribute group 2 is set to be false. For the business attribute group 3, a field value corresponding to the required_all of the business attribute group 3 is set to be false. The business attribute group 1 includes a to-be-verified business attribute 1 and a to-be-verified business attribute 2, and specifically stores detailed information of these business attribute verifications, for example, a name of a business attribute, a file upload type, whether an audit is required, an example file, and the like.

According to the present disclosure, different target files can be flexibly configured according to different regions and different business types, its corresponding business attribute requirements can be flexibly configured, and business attribute verification and management are facilitated.

At block 220, the electronic device 110, in response to obtaining the plurality of to-be-verified files through the upload portal, determines, based on the configured business attribute information, attribute states of a plurality of business attributes corresponding to the target region, and the configured business attribute information indicates current attribute states of different types of business attribute requirements.

In some embodiments, the user may obtain the plurality of to-be-verified files by clicking the upload portal.

In order to solve the problem that the business attribute configurations of the business in different regions are changed frequently, and the user provides the to-be-verified file with hysteresis, in some embodiments, the attribute state may be any suitable type of state, as an example, the attribute state includes an aging state of the business attribute, and the aging state representing whether the business attribute is valid at the current time. The current attribute state may also be any other suitable state and etc., and details are not described herein again.

In some embodiments, the electronic device 110 may, for each of the plurality of business attributes, sequentially query whether the current time is greater than a valid time period required by the business attribute according to a predetermined time interval. The electronic device 110 may, in response to the current time not being greater than the valid time period required by the business attribute, determine whether the current time is greater than the valid time period required by the business attribute after a predetermined time interval corresponding to the current time.

For example, for the business attribute A, the valid time period required by the business attribute A is 17 PM on the May 13, 2024, and the predetermined time interval is 5 minutes; if the current time is 16:56 on the May 13, 2024, then the current time is not greater than the valid time period required by the business attribute A, then the electronic device 110 may determine again, at 15:01 on the May 13, 2024, whether the current time is greater than the valid time period required by the business attribute A.

In some embodiments, after sequentially querying whether the current time is greater than the valid time period required by the business attribute according to the predetermined time interval, the electronic device 110 may, in response to the current time being greater than the valid time period required by the business attribute, determine whether a valid business attribute of the target business in the target region that is to be verified is present before the current time. The electronic device 110 may, in response to the presence of the valid business attribute of the target business in the target region that is to be verified before the current time, set a first target business attribute associated with the business attribute to be verified to be invalid. For example, the target file includes the business attribute A and the business attribute B, and if the current time is greater than the valid period required by the business attribute A and determines whether a valid business attribute configuration C before the current time is present, the business attribute configuration includes the business attribute to-be-verified of the target business in the target region, the business attribute configuration C includes the business attribute D and the business attribute E, and may include that both the business attribute D and the business attribute E included in the business attribute configuration C are set to be invalid, and set the business attribute A to be valid at the current time.

In some embodiments, the electronic device 110 may, in response to an absence of the valid business attribute of the target business in the target region before the current time, set the business attribute to be valid at the current time. In some embodiments, the electronic device 110 may determine the current time as the valid time corresponding to the business attribute after setting the business attribute to be valid at the current time.

FIG. 6 is a schematic diagram of a process of whether a business attribute is valid according to some embodiments of the present disclosure, and the description is performed for the FIG. 6.

At block 601, the electronic device 110 may set a timing task to check the valid time period required by each business attribute. Some business attributes in each business attribute may be in an effective state, or may be in a pending state (invalid).

At block 602, the electronic device 110 traverses all pending business attributes.

At block 603, the electronic device 110 may check whether the current time is greater than the valid time period required by the pending business attribute, and if yes, perform the operation at block 604, otherwise, perform the operation at block 605.

At block 604, the electronic device 110 may invalidate each previous business attribute of the target business in the target region.

At block 605, the electronic device 110 may skip the effective configuration at this time, and perform effective configuration next time.

At block 606, the electronic device 110 validate the pending qualification file.

According to the present disclosure, the valid time period required by each business attribute is set, frequent change of the business attribute configuration of the target business in different regions, and the problem that the to-be-verified file provided by the user has hysteresis can be effectively solved.

Returning to FIG. 2, at block 230, the electronic device 110 determines, based on the attribute states of the plurality of business attributes, verification states of a plurality of business attribute groups associated with the target region, wherein a verification state of each business attribute group is determined based on an attribute state of at least one business attribute in the business attribute group.

In some embodiments, for each business attribute group, if required_all corresponding to the business attribute group is true, then the business attribute group is the first business attribute group. If each business attribute in the first business attribute group all satisfies the first predetermined condition, the electronic device 110 may determine that the first business attribute group passes the verification.

The first predetermined condition may be that the business attribute passes the verification. If required_all corresponding to the business attribute group is false, then the business attribute group is the second business attribute group. If any one of the business attributes in the second business attribute group satisfies the second predetermined condition, the electronic device 110 may determine that the second business attribute group passes the verification. The second predetermined condition may be that the business attribute passes the verification.

Figure 7:
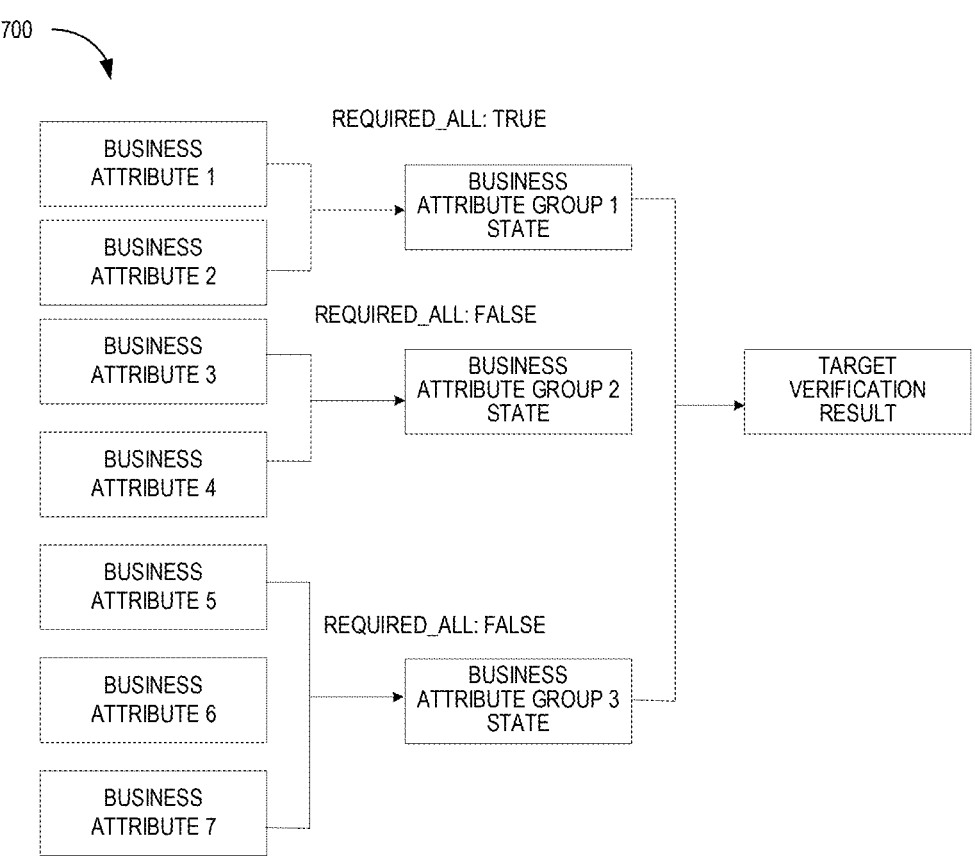
FIG. 7 is a schematic diagram of a process of processing information according to some embodiments of the present disclosure.

FIG. 7 is a schematic diagram of a process of a business attribute group verification according to some embodiments of the present disclosure, description is now performed for the FIG. 7.

If both the business attribute 1 and the business attribute 2 pass the verification, the business attribute group 1 passes the verification. If any one of the business attribute 3 and the business attribute 4 passes the verification, the business attribute group 2 passes the verification. If any one of the business attribute 5, the business attribute 6, and the business attribute 7 passes the verification, the business attribute group 3 passes the verification.

In some embodiments, the electronic device 110 may determining a to-be-verified phase corresponding to the current time, and for different to-be-verified phase, a verification manner of each business attribute group may be different. As an example, some to-be-verified files in some to-be-verified phases do not need to be uploaded, that is, whether the to-be-verified file is uploaded does not affect whether a verification of a certain business attribute group is passed. In some embodiments, the plurality of business attributes correspond to a first identification, the first identification is used to represent whether the to-be-verified file corresponding to the plurality of business attributes must be uploaded, the first identification is only effective for the first phase, and is not effective for the second phase.

For the plurality of business attribute groups, the electronic device 110 may, in response to the to-be-verified phase being a first phase, in accordance with a determination that all business attributes other than the business attribute corresponding to the first identification that must be uploaded in the business attribute group pass the verification, determine that the business attribute group passes the verification.

For the plurality of business attribute groups, the electronic device 110 may, in response to the to-be-verified phase being a second phase, in accordance with a determination that respective business attributes in the business attribute group pass the verification, determine that the business attribute group passes the verification, wherein the second phase is later than the first phase.

As an example, if the target business is the shelfing of the target object and the target object is a commodity, the to-be-verified phase includes at least, but not limited to, a pre-shelfing phase and a commodity shelfing phase, wherein the pre-shelfing phase is also the first phase, and the shelfing phase is the second phase. For the pre-shelfing phase of the commodity, the to-be-verified file corresponding to some business attribute does not require that the to-be-verified file needs to be uploaded, so whether the business attribute passes the verification at this phase does not necessarily affect whether the business attribute group in which the business attribute is located passes the verification, that is, the first identification in the pre-shelfing phase of the commodity is effective. For the to-be-verified files corresponding to all the business attributes in the commodity shelfing phase, the to-be-verified file all must be uploaded, so whether the business attribute in the commodity shelfing phase passes the verification affects whether the business attribute group in which the business attribute is located passes the verification, that is, the first identification of the commodity shelfing phase is invalid.

Using Table 1 as an example, if the to-be-verified phase is the pre-shelfing phase of the commodity, for the business attribute group 1, if the business attribute 2 does not pass the verification, it is determined that the business attribute group 1 does not pass the verification, and whether the business attribute 1 is uploaded or not, or passes the verification or not, is irrelevant to whether the business attribute group 1 passes the verification or not. For the business attribute group 2, if at least one of the business attribute 3 and the business attribute 4 passes the verification, it is determined that the business attribute group 2 passes the verification. For the business attribute group 3, if at least one of the business attribute 5, the business attribute 6, and the business attribute 7 passes the verification, it is determined that the business attribute group 3 passes the verification.

Using Table 1 as an example, if the to-be-verified phase is the pre-shelfing phase of the commodity, for the business attribute group 1, if both the business attribute 2 and the business attribute 1 pass the verification, then it is determined that the business attribute group 1 passes the verification. For the business attribute group 2, if at least one of the business attribute 3 and the business attribute 4 passes the verification, then it is determined that the business attribute group 2 is authenticated. For the business attribute group 3, if at least one of the business attribute 5, the business attribute 6, and the business attribute 7 passes the verification, it is determined that the business attribute group 3 passes the verification.

It should be noted that, for the business attribute whose validity status is valid, whether the business attribute passes the verification may be further determined, and whether the business attribute passes the verification may be further determined after the business attribute whose effective status is invalid becoming valid, that is, in response to the effective status corresponding to the business attribute to be verified is not effective, the verification of the business attribute to be verified does not pass.

At block 240, the electronic device 110, in response to the plurality of business attribute groups passing a verification, generates a target verification result for the target business in the target region.

In some embodiments, the electronic device 110 may determine, in response to the plurality of business attribute groups passing the verification, that the target verification result of the target business in the target region is passing verification. Taking FIG. 7 as an example, the business attribute group 1, the business attribute group 2, and the business attribute group 3 all pass the verification, and the target verification result is passing the verification.

In some embodiments, the electronic device 110 may determine that the target business fails to verify the authentication in the target region in response to the presence of at least one business attribute group in each business attribute group not passing the verification. Taking FIG. 7 as an example, if at least one of the business attribute group 1, the business attribute group 2, and the business attribute group 3 not passing the verification, it is determined that the verification result of the target business in the target region is not passing the verification.

In some embodiments, to facilitate viewing the verification progress corresponding to each business attribute, after providing the target interface, the electronic device 110 may display the log viewing portal corresponding to the plurality of business attributes via the target interface. As shown in FIG. 3, the target interface may include a log viewing portal 330 corresponding to the business attribute 1 and a log viewing portal corresponding to the business attribute 2 and the like.

The electronic device 110 may, in response to receiving a selection of the log viewing portal corresponding to a second target business attribute in the plurality of business attributes, display verification flow information of the second target business attribute. In some embodiments, the verification flow information may include, but is not limited to, at least one of the following: an upload time of the target to-be-verified file associated with the second target business attribute, user information for uploading the target to-be-verified text, an attribute state corresponding to the second target business attribute at the current time, and a valid time corresponding to the second target business attribute.

Figure 8:
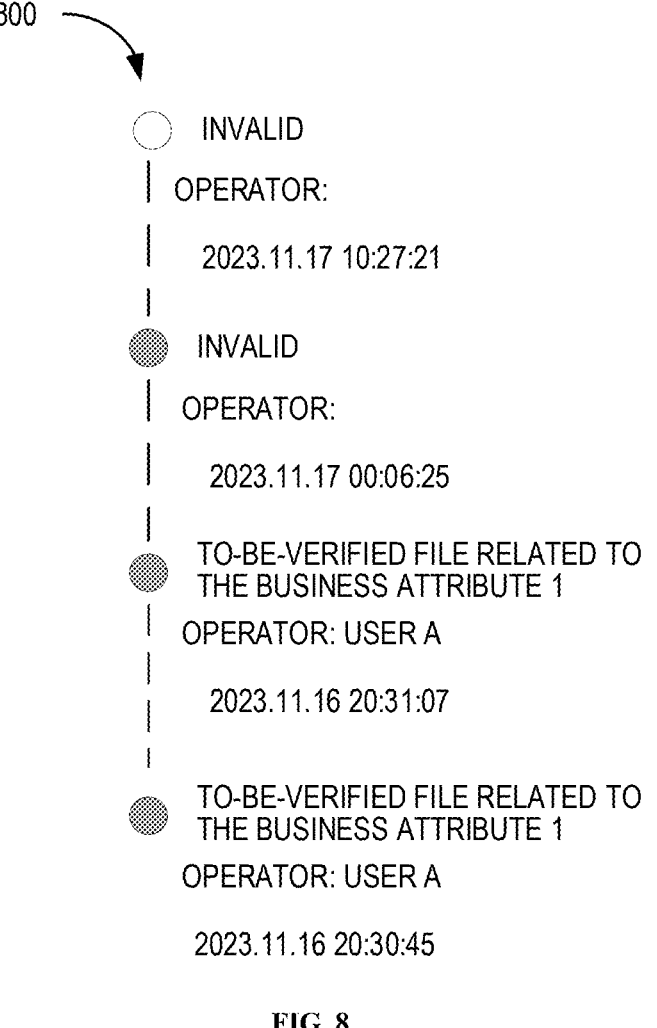
FIG. 8 illustrates an example interaction interface according to some embodiments of the present disclosure.

Taking FIG. 8 as an example, the target interface may be displayed at 2023.11.16, 20: 30: 45, and the user A imports the business attribute at this moment. The target interface may further display the business attribute at 2023.11.17 10: 27: 21 in an invalid state.

According to the present disclosure, the verification progress corresponding to each business attribute can be viewed based on the target interface, and the problem that the business attribute has inconformity and cannot be traced due to factors such as frequent business attribute configuration change, complex business flow and long consumed time and the like can be effectively avoided.

According to the embodiment of the present disclosure, whether the plurality of business attribute groups associated with the target region pass the verification or not can be determined, thereby the target verification result of the target business in the target region can be determined, and the verification efficiency of the target business in the target region can be effectively improved.

Example Apparatus and Device

Figure 9:
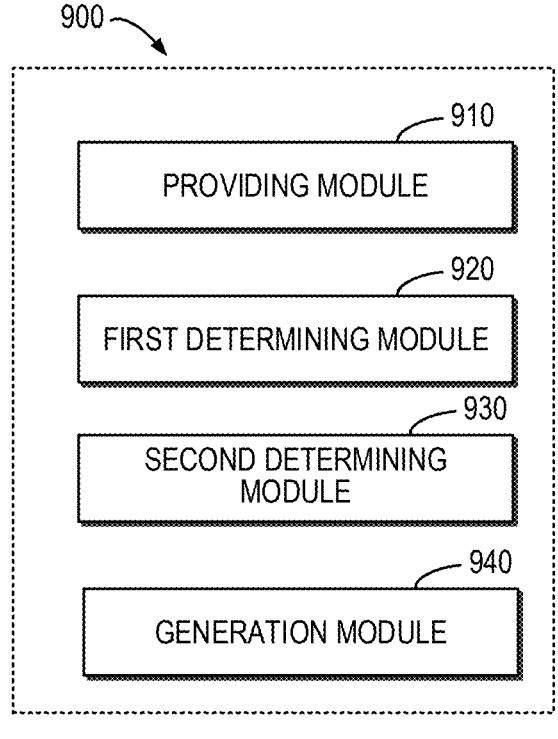
FIG. 9 is a schematic structural block diagram of an apparatus for processing information according to some embodiments of the present disclosure.

Embodiments of the present disclosure also provide a corresponding apparatus for implementing the above method or process. FIG. 9 shows a schematic structural block diagram of an example apparatus 900 for processing information according to some embodiments of the present disclosure. The apparatus 900 may be implemented or included in the electronic device 110. The various modules/ components in the apparatus 900 may be implemented by hardware, software, firmware, or any combination thereof.

As shown in FIG. 9, the apparatus 900 comprises: a providing module 910, configured to provide a target interface, the target interface displaying an upload portal corresponding to a to-be-verified file corresponding to a target business in a target region; a first determining module 920, configured to, in response to obtaining a plurality of to-be-verified files through the upload portal, determine attribute states of a plurality of business attributes corresponding to the target region based on configured business attribute information, the configured business attribute information indicating current attribute states of different types of business attribute requirements; a second determining module 930, configured to determine, based on the attribute states of the plurality of business attributes, verification states of a plurality of business attribute groups associated with the target region, wherein a verification state of each business attribute group is determined based on an attribute state of at least one business attribute in the business attribute group; and a generation module 940, configured to, in response to the plurality of business attribute groups passing a verification, generate a target verification result for the target business in the target region.

In some embodiments, the plurality of business attribute groups comprising a first business attribute group, and the second determining module 930 is further configured to, in response to each business attribute in the first business attribute group satisfying a first predetermined condition, determine that the first business attribute group passes the verification.

In some embodiments, the plurality of business attribute groups comprising a second business attribute group, and the second determining module 930 is further configured to, in response to any business attribute in the second business attribute group satisfying a second predetermined condition, determine that the second business attribute group passes the verification.

In some embodiments, the attribute states comprising an aging state of a business attribute, the aging state representing whether the business attribute is valid at a current time; the first determining module 920 is further configured to, for each of the plurality of business attributes, sequentially query whether the current time is greater than a valid time period required by the business attribute according to a predetermined time interval; and in response to the current time not being greater than the valid time period required by the business attribute, determine whether the current time is greater than the valid time period required by the business attribute after a predetermined time interval corresponding to the current time.

In some embodiments, the apparatus 900 further includes a third determining module, configured to: in response to the current time being greater than the valid time period required by the business attribute, determining whether a valid business attribute of the target business in the target region that is to be verified is present before the current time; a first setting module, configured to, in response to the presence of the valid business attribute of the target business in the target region that is to be verified before the current time, set a first target business attribute associated with the business attribute to be verified to be invalid; and a second setting module, configured to, in response to an absence of the valid business attribute of the target business in the target region before the current time, set the business attribute to be valid at the current time.

In some embodiments, the apparatus 900 further includes a fourth determining module configured to: determine the current time as a valid time corresponding to the business attribute.

In some embodiments, a plurality of business attributes correspond to a first identification, the first identification representing whether a to-be-verified file corresponding to the plurality of business attributes must be uploaded, and the second determining module 930 is further configured to determine a to-be-verified phase corresponding to the current time; for the plurality of business attribute groups, in response to the to-be-verified phase being a first phase, in accordance with a determination that all business attributes other than the business attribute corresponding to the first identification that must be uploaded in the business attribute group pass the verification, determine that the business attribute group passes the verification; and for the plurality of business attribute groups, in response to the to-be-verified phase being a second phase, in accordance with a determination that respective business attributes in the business attribute group pass the verification, determine that the business attribute group passes the verification, wherein the second phase is later than the first phase.

In some embodiments, the plurality of business attributes is obtained based on a target file.

In some embodiments, the plurality of business attributes are determined by the following process: determining whether the target file comprises a second identification corresponding to the plurality of business attributes, the second identification representing a business attribute reset; in response to at least one of the plurality of business attributes being set with the second identification, deleting the target file; and in response to receiving a new file, obtaining the plurality of business attributes based on the new file.

In some embodiments, the apparatus 900 further comprises an obtaining module configured to: in response to none of the plurality of business attributes comprising the second identification, obtain the plurality of business attributes based on the target file.

In some embodiments, the apparatus 900 further comprises a first display module configured to: display, via the target interface, a log viewing portal corresponding to the plurality of business attributes; and a second display module configured to: in response to receiving a selection of the log viewing portal corresponding to a second target business attribute in the plurality of business attributes, display verification flow information of the second target business attribute.

In some embodiments, the verification flow information comprises at least one of the following: upload time of a target to-be-verified file associated with the second target business attribute, user information for uploading the target to-be-verified text, an attribute state corresponding to the second target business attribute at the current time, and a valid time corresponding to the second target business attribute.

The units included in the apparatus 900 may be implemented in various manners, including software, hardware, firmware, or any combination thereof. In some embodiments, one or more units may be implemented using software and/or firmware, such as machine-executable instructions stored on a storage medium. In addition to or as an alternative to machine-executable instructions, some or all of the elements in the apparatus 900 may be implemented, at least in part, by one or more hardware logic components. By way of example and not limitation, exemplary types of hardware logic components that may be used include field programmable gate arrays (FPGAs), application specific integrated circuits (ASICs), application specific standards (ASSPs), system-on-a-chip (SOCs), complex programmable logic devices (CPLDs), and the like.

Figure 10:
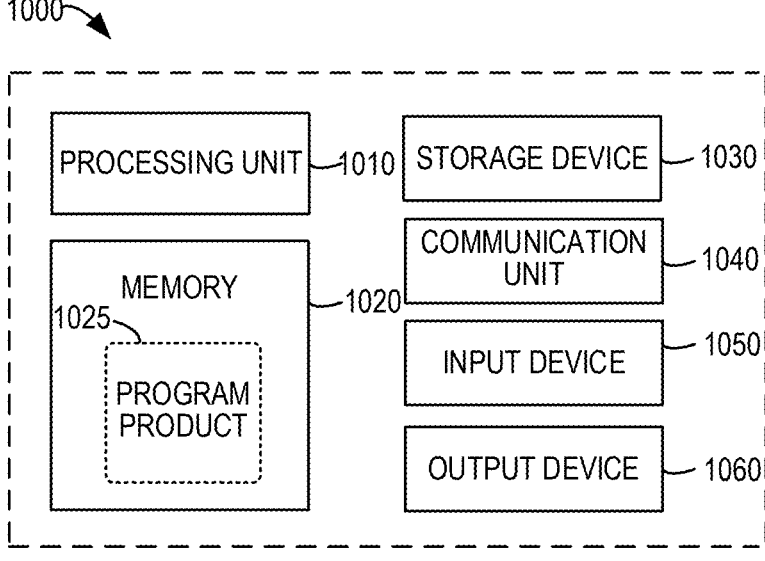
FIG. 10 illustrates a block diagram of an electronic device capable of implementing various embodiments of the present disclosure.

FIG. 10 illustrates a block diagram of an electronic device 1000 in which one or more embodiments of the present disclosure may be implemented. It should be understood that the electronic device 1000 illustrated in FIG. 10 is merely exemplary and should not constitute any limitation on the functionality and scope of the embodiments described herein. The electronic device 1000 shown in FIG. 10 may be configured to implement the electronic device 110 shown in FIG. 1.

As shown in FIG. 10, the electronic device 1000 is in the form of a general-purpose electronic device. Components of the electronic device 1000 may include, but are not limited to, one or more processors or processing units 1010, a memory 1020, a storage device 1030, one or more communication units 1040, one or more input devices 1050, and one or more output devices 1060. The processing unit 1010 may be an actual or virtual processor and capable of performing various processes according to programs stored in the memory 1020. In multiprocessor systems, multiple processing units execute computer-executable instructions in parallel to improve parallel processing capabilities of electronic device 1000.

Electronic device 1000 typically includes a plurality of computer storage media. Such media may be any available media accessible to the electronic device 1000, including, but not limited to, volatile and non-volatile media, removable and non-removable media. The memory 1020 may be volatile memory (e.g., registers, caches, random access memory (RAM)), non-volatile memory (e.g., read-only memory (ROM), electrically erasable programmable read-only memory (EEPROM), flash memory), or some combination thereof. Storage device 1030 may be a removable or non-removable medium and may include a machine-readable medium, such as a flash drive, magnetic disk, or any other medium, which may be capable of storing information and/or data (e.g., training data for training) and may be accessed within electronic device 1000.

The electronic device 1000 may further include additional removable/non-removable, volatile/non-volatile storage media. Although not shown in FIG. 10, a disk drive for reading or writing from a removable, nonvolatile magnetic disk (e.g., a "floppy disk") and an optical disk drive for reading or writing from a removable, nonvolatile optical disk may be provided. In these cases, each drive may be connected to a bus (not shown) by one or more data media interfaces. The memory 1020 may include a computer program product 1025 having one or more program modules configured to perform various methods or actions of various embodiments of the present disclosure.

The communication unit 1040 is configured to communicate with another electronic device through a communication medium. Additionally, the functionality of components of the electronic device 1000 may be implemented in a single computing cluster or multiple computing machines capable of communicating over a communication connection. Thus, the electronic device 1000 may operate in a networked environment using logical connections with one or more other servers, network personal computers (PCs), or another network node.

The input device 1050 may be one or more input devices such as a mouse, a keyboard, a trackball, or the like. The output device 1060 may be one or more output devices, such as a display, a speaker, a printer, or the like. The electronic device 1000 may also communicate with one or more external devices (not shown) through the communication unit 1040 as needed, external devices such as storage devices, display devices, etc., communicate with one or more devices that enable a user to interact with the electronic device 1000, or communicate with any device (e.g., a network card, a modem, etc.) that enables the electronic device 1000 to communicate with one or more other electronic devices. Such communication may be performed via an input/output (I/O) interface (not shown).

According to example implementations of the present disclosure, there is provided a computer-readable storage medium having computer-executable instructions stored thereon, wherein the computer-executable instructions are executed by a processor to implement the method described above. According to example implementations of the present disclosure, a computer program product is further provided, the computer program product being tangibly stored on a non-transitory computer-readable medium and including computer-executable instructions, the computer-executable instructions being executed by a processor to implement the method described above.

Aspects of the present disclosure are described herein with reference to flowcharts and/or block diagrams of methods, apparatuses, devices, and computer program products implemented in accordance with the present disclosure. It should be understood that each block of the flowchart and/or block diagram, and combinations of blocks in the flowcharts and/or block diagrams, may be implemented by computer readable program instructions.

These computer-readable program instructions may be provided to a processing unit of a general purpose computer, special purpose computer, or other programmable data processing apparatus to produce a machine, such that the instructions, when executed by a processing unit of a computer or other programmable data processing apparatus, produce means to implement the functions/acts specified in the flowchart and/or block diagram. These computer-readable program instructions may also be stored in a computer-readable storage medium that cause the computer, programmable data processing apparatus, and/or other devices to function in a particular manner, such that the computer-readable medium storing instructions includes an article of manufacture including instructions to implement aspects of the functions/acts specified in the flowchart and/or block diagram (s).

The computer-readable program instructions may be loaded onto a computer, other programmable data processing apparatus, or other apparatus, such that a series of operational steps are performed on a computer, other programmable data processing apparatus, or other apparatus to produce a computer-implemented process such that the instructions executed on a computer, other programmable data processing apparatus, or other apparatus implement the functions/acts specified in the flowchart and/or block diagram block or blocks.

The flowchart and block diagrams in the figures show architecture, functionality, and operation of possible implementations of systems, methods, and computer program products according to various implementations of the present disclosure. In this regard, each block in the flowchart or block diagram may represent a module, program segment, or portion of an instruction that includes one or more executable instructions for implementing the specified logical function. In some alternative implementations, the functions noted in the blocks may also occur in a different order than noted in the figures. For example, two consecutive blocks may actually be performed substantially in parallel, which may sometimes be performed in the reverse order, depending on the functionality involved. It is also noted that each block in the block diagrams and/or flowchart, as well as combinations of blocks in the block diagrams and/or flowchart, may be implemented with a dedicated hardware-based system that performs the specified functions or actions, or may be implemented in a combination of dedicated hardware and computer instructions.

Various implementations of the present disclosure have been described above, which are exemplary, not exhaustive, and are not limited to the implementations disclosed. Many modifications and variations will be apparent to those of ordinary skill in the art without departing from the scope and spirit of the various implementations illustrated. The selection of the terms used herein is intended to best explain the principles of the implementations, the practical application, or improvements to the technology in the marketplace, or to enable others of ordinary skill in the art to understand the various implementations disclosed herein.

We claim:

1. A method for processing information, comprising:

providing a target interface, the target interface displaying an upload portal corresponding to a to-be-verified file corresponding to a target business' in a target region;

in response to obtaining a plurality of to-be-verified files through the upload portal, determining attribute states of a plurality of business attributes corresponding to the target region based on configured business attribute information, the attribute states comprising an aging state of a business attribute, the aging state representing whether the business attribute is valid at a current time, the configured business attribute information indicating current attribute states of different types of business attribute requirements, wherein the determining the attribute states of the plurality of business attributes comprises:

for each of the plurality of business attributes, sequentially querying whether the current time is greater than a valid time period required by the business attribute according to a predetermined time interval, and in response to the current time not being greater than the valid time period required by the business attribute, determining whether the current time is greater than the valid time period required by the business attribute after a predetermined time interval corresponding to the current time;

determining, based on the attribute states of the plurality of business attributes, verification states of a plurality of business attribute groups associated with the target region, wherein a verification state of each business attribute group is determined based on an attribute state of at least one business attribute in the business attribute group; and in response to the plurality of business attribute groups passing a verification, generating a target verification result for the target business in the target region.

2. The method of claim 1, the plurality of business attribute groups comprising a first business attribute group, wherein determining, based on the attribute states of the plurality of business attributes, the verification states of the plurality of business attribute groups associated with the target region comprises:

in response to each business attribute in the first business attribute group satisfying a first predetermined condition, determining that the first business attribute group passes the verification.

3. The method of claim 1, the plurality of business attribute groups comprising a second business attribute group, wherein determining, based on the attribute states of the plurality of business attributes, the verification states of the plurality of business attribute groups associated with the target region comprises:

in response to any business attribute in the second business attribute group satisfying a second predetermined condition, determining that the second business attribute group passes the verification.

4. The method of claim 1, after sequentially querying whether the current time is greater than the valid time period required by the business attribute according to the predetermined time interval, the method further comprising: in response to the current time being greater than the valid time period required by the business attribute, determining whether a valid business attribute of the target business in the target region that is to be verified is present before the current time; in response to the presence of the valid business attribute of the target business in the target region that is to be verified before the current time, setting a first target business attribute associated with the business attribute to be verified to be invalid; and in response to an absence of the valid business attribute of the target business in the target region before the current time, setting the business attribute to be valid at the current time.

5. The method of claim 4, after setting the business attribute to be valid at the current time, the method further comprising:

determining the current time as a valid time corresponding to the business attribute.

6. The method of claim 1, a plurality of business attributes correspond to a first identification, the first identification representing whether a to-be-verified file corresponding to the plurality of business attributes must be uploaded, wherein determining the verification states of the plurality of business attribute groups associated with the target region comprises:

determining a to-be-verified phase corresponding to the current time;

for the plurality of business attribute groups, in response to the to-be-verified phase being a first phase, in accordance with a determination that all business attributes other than the business attribute corresponding to the first identification that must be uploaded in the business attribute group pass the verification, determining that the business attribute group passes the verification; and for the plurality of business attribute groups, in response to the to-be-verified phase being a second phase, in accordance with a determination that respective business attributes in the business attribute group pass the verification, determining that the business attribute group passes the verification, wherein the second phase is later than the first phase.

7. The method of claim 1, wherein the plurality of business attributes is obtained based on a target file.

8. The method of claim 1, the plurality of business attributes are determined by the following process:

determining whether the target file comprises a second identification corresponding to the plurality of business attributes, the second identification representing a business attribute reset;

in response to at least one of the plurality of business attributes being set with the second identification, deleting the target file; and in response to receiving a new file, obtaining the plurality of business attributes based on the new file.

9. The method of claim 8, after determining whether the target file comprises the second identification corresponding to the plurality of business attributes, the method further comprising:

in response to none of the plurality of business attributes comprising the second identification, obtaining the plurality of business attributes based on the target file.

10. The method of claim 1, after providing the target interface, the method further comprising:

displaying, via the target interface, a log viewing portal corresponding to the plurality of business attributes; and in response to receiving a selection of the log viewing portal corresponding to a second target business attribute in the plurality of business attributes, displaying verification flow information of the second target business attribute.

11. The method of claim 10, the verification flow information comprises at least one of the following:

upload time of a target to-be-verified file associated with the second target business attribute, user information for uploading the target to-be-verified text, an attribute state corresponding to the second target business attribute at the current time, a valid time corresponding to the second target business attribute.

12. An electronic device, comprising: at least one processing unit; and at least one memory coupled to the at least one processing unit and storing instructions for execution by the at least one processing unit, the instructions, when executed by the at least one processing unit, causing the electronic device to perform a method for processing information comprising: providing a target interface, the target interface displaying an upload portal corresponding to a to-be-verified file corresponding to a target business in a target region; in response to obtaining a plurality of to-be-verified files through the upload portal, determining attribute states of a plurality of business attributes corresponding to the target region based on configured business attribute information, the attribute states comprising an aging state of a business attribute, the aging state representing whether the business attribute is valid at a current time, the configured business attribute information indicating current attribute states of different types of business attribute requirements; wherein the determining the attribute states of the plurality of business attributes comprises:

for each of the plurality of business attributes, sequentially querying whether the current time is greater than a valid time period required by the business attribute according to a predetermined time interval, and in response to the current time not being greater than the valid time period required by the business attribute, determining whether the current time is greater than the valid time period required by the business attribute after a predetermined time interval corresponding to the current time;

determining, based on the attribute states of the plurality of business attributes, verification states of a plurality of business attribute groups associated with the target region, wherein a verification state of each business attribute group is determined based on an attribute state of at least one business attribute in the business attribute group; and in response to the plurality of business' attribute groups passing a verification, generating a target verification result for the target business in the target region.

13. The electronic device of claim 12, the plurality of business attribute groups comprising a first business attribute group, wherein determining, based on the attribute states of the plurality of business attributes, the verification states of the plurality of business attribute groups associated with the target region comprises:

in response to each business attribute in the first business attribute group satisfying a first predetermined condition, determining that the first business attribute group passes the verification.

14. The electronic device of claim 12, the plurality of business attribute groups comprising a second business attribute group, wherein determining, based on the attribute states of the plurality of business attributes, the verification states of the plurality of business attribute groups associated with the target region comprises:

in response to any business attribute in the second business attribute group satisfying a second predetermined condition, determining that the second business attribute group passes the verification.

15. The electronic device of claim 12, after sequentially querying whether the current time is greater than the valid time period required by the business attribute according to the predetermined time interval, the method further comprising: in response to the current time being greater than the valid time period required by the business attribute, determining whether a valid business attribute of the target business in the target region that is to be verified is present before the current time; in response to the presence of the valid business attribute of the target business in the target region that is to be verified before the current time, setting a first target business attribute associated with the business attribute to be verified to be invalid; and in response to an absence of the valid business attribute of the target business in the target region before the current time, setting the business attribute to be valid at the current time.

16. The electronic device of claim 15, after setting the business attribute to be valid at the current time, the method further comprising:

determining the current time as a valid time corresponding to the business attribute.

17. The electronic device of claim 12, a plurality of business attributes correspond to a first identification, the first identification representing whether a to-be-verified file corresponding to the plurality of business attributes must be uploaded, wherein determining the verification states of the plurality of business attribute groups associated with the target region comprises:

determining a to-be-verified phase corresponding to the current time;

for the plurality of business attribute groups, in response to the to-be-verified phase being a first phase, in accordance with a determination that all business attributes other than the business attribute corresponding to the first identification that must be uploaded in the business attribute group pass the verification, determining that the business attribute group passes the verification; and for the plurality of business attribute groups, in response to the to-be-verified phase being a second phase, in accordance with a determination that respective business attributes in the business attribute group pass the verification, determining that the business attribute group passes the verification, wherein the second phase is later than the first phase.

18. A non-transitory computer-readable storage medium having a computer program stored thereon, the computer program, when executed by a processor, implementing a method for processing information comprising:

providing a target interface, the target interface displaying an upload portal corresponding to a to-be-verified file corresponding to a target business in a target region;

in response to obtaining a plurality of to-be-verified files through the upload portal, determining attribute states of a plurality of business attributes corresponding to the target region based on configured business attribute information, the attribute states comprising an aging state of a business attribute, the aging state representing whether the business attribute is valid at a current time, the configured business attribute information indicating current attribute states of different types of business attribute requirements;

wherein the determining the attribute states of the plurality of business attributes comprises:

for each of the plurality of business attributes, sequentially querying whether the current time is greater than a valid time period required by the business attribute according to a predetermined time interval, and in response to the current time not being greater than the valid time period required by the business attribute, determining whether the current time is greater than the valid time period required by the business attribute after a predetermined time interval corresponding to the current time;

determining, based on the attribute states of the plurality of business attributes, verification states of a plurality of business attribute groups associated with the target region, wherein a verification state of each business attribute group is determined based on an attribute state of at least one business attribute in the business attribute group; and in response to the plurality of business attribute groups passing a verification, generating a target verification result for the target business in the target region.

* * * * *